July 12, 1960
E. F. EGAN
2,945,175
ELECTRICAL LOGGING SYSTEM FOR EXPLORING
SUBSURFACE FORMATIONS
Filed Dec. 21, 1956
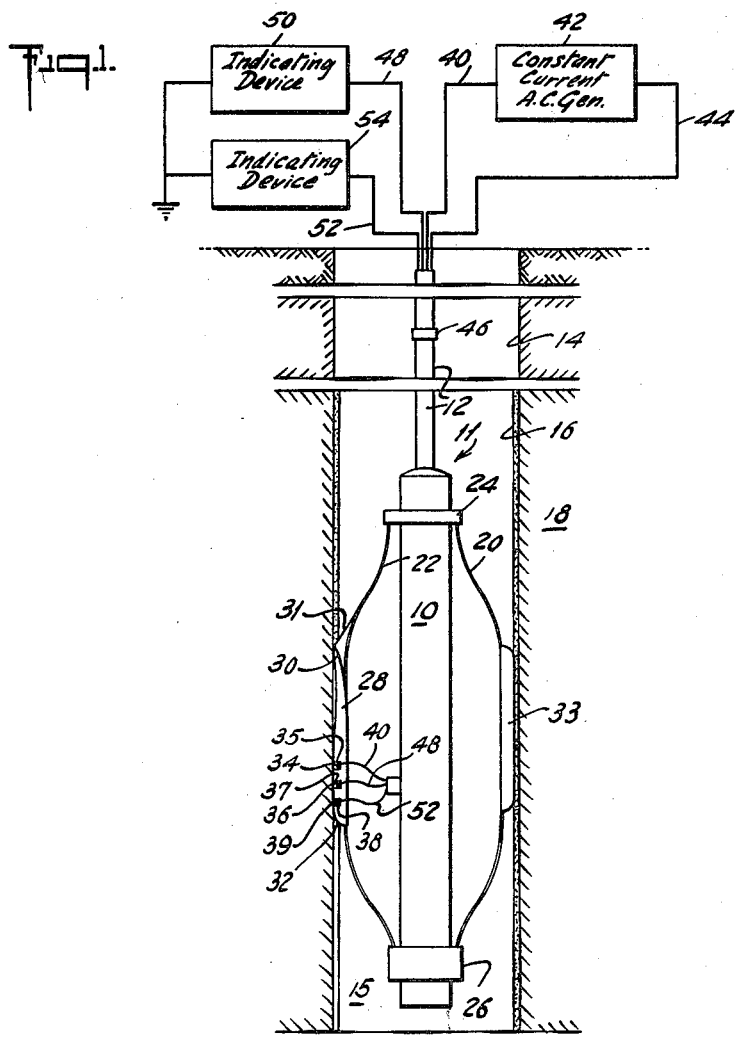
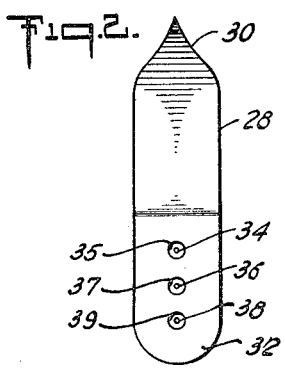

United States Patent Office 2,945,175
Patented July 12, 1960

2,945,175
ELECTRICAL LOGGING SYSTEM FOR EXPLORING SUBSURFACE FORMATIONS

Edmond F. Egan, Houston, Tex., assignor to Texaco Inc., a corporation of Delaware Filed Dec. 21, 1956, Ser. No. 629,914

3 Claims. (Cl. 324—10)

This invention relates to an electrical logging system for exploring subsurface formations and more particularly to an electrical logging system utilizing closely spaced electrodes embedded in a pad or cushion.

In well drilling operations it is customary to use drilling muds comprising finely divided particles suspended in a liquid, for example, water. The hydrostatic pressure at any given point in the column of mud in the well is normally greater than the pressure at an adjacent point in the subsurface formations traversed by the borehole. Therefore, the mud tends to flow into the subsurface formations when the formations are permeable. The permeable subsurface formations screen out the particles of the mud permitting only the mud filtrate to invade the formation to form an invaded zone therein and a layer or cake of mud on the wall of the borehole. The mud cake may have a thickness of one or more inches and the mud filtrate may invade a permeable formation to a distance of one foot or more.

It is known that a knowledge of the voltage distribution in the subsurface formations can lead to quantitative determinations of hydrocarbon saturations, for example oil, in porous formations. A great variety of attempts have been made in past years to measure in situ the voltage distribution in or resistivity of earth formations penetrated by boreholes. Prior art electrical logging systems which have been used for deriving the porosity of formations and for providing detailed correlation are systems which utilize a pad designed to ride over and in contact with the mud cake, such as the systems illustrated and described in U.S. Patent Nos. 2,669,688 and 2,712,629. These prior art contact pad systems attempt to measure the resistivity of the invaded zone of a permeable formation, which resistivity is used to determine the formation resistivity factor, which factor in turn is used to calculate porosity. Embedded in the contact pad of these systems is a plurality of closely spaced electrodes disposed therein to produce highly localized measurements near the wall of the borehole, for example, measurements produced from a radius of investigation behind the borehole face of one to two inches. Since the mud cake over which the contact pad rides generally has a much lower resistivity than that of the invaded zone which lies immediately behind the mud cake, resistivity measurements of the invaded zone obtained by the use of prior art contact pad systems are often considerably affected by the presence of the mud cake disposed between the pad and the invaded zone. Graphs have been made which are used to correct the measurements for the presence of the mud cake. However, since the thickness of the mud cake in the borehole can vary greatly and since the resistivity of the mud cake changes with changes in temperature and with changes in the composition of the many types of muds presently used in drilling a borehole, the corrections can be regarded merely as an approximation.

In accordance with the present invention an electrical logging system is provided which produces highly localized resistivity measurements at the wall of the borehole which are not affected by the mud cake in the borehole. The system of the invention utilizes a pad which is designed to cut through the mud cake to thus place the pad in direct contact with the invaded zone of a permeable formation.

In order that the invention may be more clearly understood and readily carried into effect it will now be described more fully with reference to the accompanying drawing in which:

Fig. 1 is a schematic diagram, partly in longitudinal section, showing the well logging system in position in a borehole in accordance with the invention; and Fig. 2 illustrates the face of the pad of the system shown in Fig. 1.

Referring to the drawing there is shown in Fig. 1 a tubular support 10 of a tool 11 suspended on an insulated cable 12 in a borehole 14 filled with a drilling fluid or mud 15 in which a mud cake 16 has formed on the wall of a permeable formation 18. Two bow springs 20 and 22 are each pivotally secured to an upper collar 24 and a lower collar 26 which collars are slidably mounted on tubular support 10. One of these two collars 24 and 26 may be rigidly secured to the tubular support 10, or stop means may be disposed on the tubular support 10 between the two collars 24, 26, to limit the movement of the collars 24 and 26 along the longitudinal axis of the tubular support 10. A pad 28 having a share or plowing end 30 and a heel 32 is carried by bow spring 22. The pad 28, the face view of which is illustrated in Fig. 2, may be made of hard rubber or of steel with an insulating rubber cover. The share end 30 of pad 28 is adapted to cut through the mud cake 16 when it is leading the heel 32 during movement of the tool 11 in the borehole 14. The heel 32 is preferably designed so that it is straight and rigid longitudinally and round and pliable in the radial direction. A rib member 31 having a leading knife edge disposed between the lead point of the share 30 and the bow spring 22 may be used to prevent the tool 11 from sticking to the wall of the borehole 14. It will be observed that the knife edge of rib member 31 extends inwardly from the point of the share 30 toward the body of the tool, at an obtuse angle to the face of the heel portion 32. The member 31 may be an integral part of the pad 28 or it may be a separate element rigidly secured to the pad 28. In the straight portion of the heel 32 of pad 28 are embedded and maintained in fixed spaced relationship to each other a current electrode 34 and two potential electrodes 36 and 38. At least a portion of each of the electrodes 34, 36 and 38 is exposed in small recesses 35, 37 and 39 respectively located in the straight portion of the face of the heel 32 of pad 28. It is pointed out that the share 28 flares out to a given width which is substantially the same as the width of heel portion 32. Also, it may be observed that the width of the heel 32 is several times greater than the width of the electrodes located therein. An auxiliary pad 33 may be carried by bow spring 20 to facilitate movement of the tool 11 through the borehole 14. An insulated conductor 40 of cable 12 is connected between the current electrode 34 and a terminal of a constant current source, for example, an alternating current generator 42, or if desired a suitable direct current generator, and a second insulated conductor 44 of cable 12 is connected between the other terminal of the alternating current generator 42 and a grounded electrode 46 disposed on cable 12 an appreciable distance from current electrode 34. A third insulated conductor 48 of cable 12 is connected between one of the potential electrodes 36 and a terminal of a first indicating device 50, the other terminal of the indicating device 50 being grounded at the surface of the earth. A fourth insulated conductor 52 of cable 12 is connected between the other potential electrode 38 and one terminal of a second indicating device 54, the other terminal of the second indicating device 54 being grounded at the surface of the earth.

In operation the tool 11 is lowered into the borehole 14 with the two collars 24 and 26 maintained in fixed or locked positions at a given distance from each other to collapse the pads 32 and 33 from the wall of the borehole 14. When the tool 11 has reached the lowest portion of the borehole 14 which is to be logged at least one of the two collars 24 and 26 is released to freely move along the longitudinal axis of the tubular support 10 to thus permit bow springs 20 and 22 to press the pads 32 and 33 against the walls of the formations. The means for releasing at least one of the collars 24 and 26 may be any one of the known releasing devices commonly used in well logging, for example, the releasing device illustrated and described in the above-mentioned U.S. Patent No. 2,669,688. As the tool 11 is moved upward in the borehole the share end 30 of pad 28 removes the mud cake 16 from the wall of the permeable formation 18 to permit the heel 32 of the pad 28 to ride directly on the invaded zone of the permeable formation 18. Since the electrodes 34, 36 and 38 are now substantially in direct contact with the invaded zone of permeable formation 18 the indicating devices 50 and 54 will produce resistivity measurements of the invaded zone which are not affected by the relatively low resistance mud cake 16 and which have a value substantially equal to the true resistivity of the invaded zone.

In the embodiment of the invention illustrated in the drawing a substantially constant current is supplied to the invaded zone of formation 18 from the alternating current generator 42 through the current electrode 34, the voltage at potential electrode 36 which is preferably spaced about one inch from current electrode 34, is indicated by indicating device 50 and the voltage at potential electrode 38, which is preferably spaced about two inches from current electrode 34, is indicated by indicating device 54. Although two potential electrodes and two indicating devices are illustrated in the drawing, only one of each is necessary to obtain the resistivity of the invaded zone; however, the system illustrated is preferred since different measurements indicated by the two indicating devices 50 and 54 will indicate the presence of a substance, for example, mud cake, other than the invaded zone in the radius of investigation of the indicating devices 50 and 54.

Although not shown in the drawing it should be understood that the resistivity of the mud cake may also be obtained, whenever desirable, by embedding in auxiliary pad 33 two or more appropriate electrodes connected to a suitable current source and indicating device.

Obviously, many modifications and variations of the invention as hereinabove set forth may be made without departing from the spirit and scope thereof and therefore only such limitations should be imposed as are indicated in the appended claims.

I claim:

1. An electrical logging system for exploring subsurface formations in a borehole having a wall on which mud cake is formed comprising a pad of a given width having means including a leading point for penetrating the mud cake to remove a strip of cake of said given width, an insulating heel portion and a rib member secured to said pad at said point and having a leading knife edge extending inwardly from said point at an obtuse angle to the face of said heel portion, means for mounting said pad for movement through said borehole and for urging said pad against the wall of the borehole, a plurality of closely spaced electrodes each being disposed in the heel portion of said pad to be in electrical contact with said wall, means for applying a voltage to at least one of said electrodes and means for detecting and indicating the voltage at the other of said electrodes.

2. In an electrical logging system employing closely spaced electrodes which are urged substantially into contact with the wall of a borehole, a pad having a share disposed at an angle to cut through a substance lying in a narrow zone extending laterally from the wall of the borehole and an insulating heel, said share having a width substantially equal to that of said heel and said heel being straight and rigid longitudinally and round and pliable radially.

3. An electrical logging system for exploring subsurface formations in a borehole having a wall on which mud cake has formed comprising an electrode for electrically contacting said subsurface formations, an insulating pad for supporting said electrode having a given width several times greater than the width of said electrode, said pad having a leading edge of share-like configuration for removing a strip of said given width of said mud cake formed on the wall of the borehole, means for mounting said pad for movement through the borehole and urging said pad against the wall of the borehole and means for detecting an electrical signal at said electrode.

References Cited in the file of this patent

UNITED STATES PATENTS

| 2,400,678 | Archie | May 21, 1946 |
| 2,588,717 | Goodwin | Mar. 11, 1952 |
| 2,747,402 | Doll | May 29, 1956 |
| 2,786,178 | Doll | Mar. 19, 1957 |